Patented Jan. 15, 1935

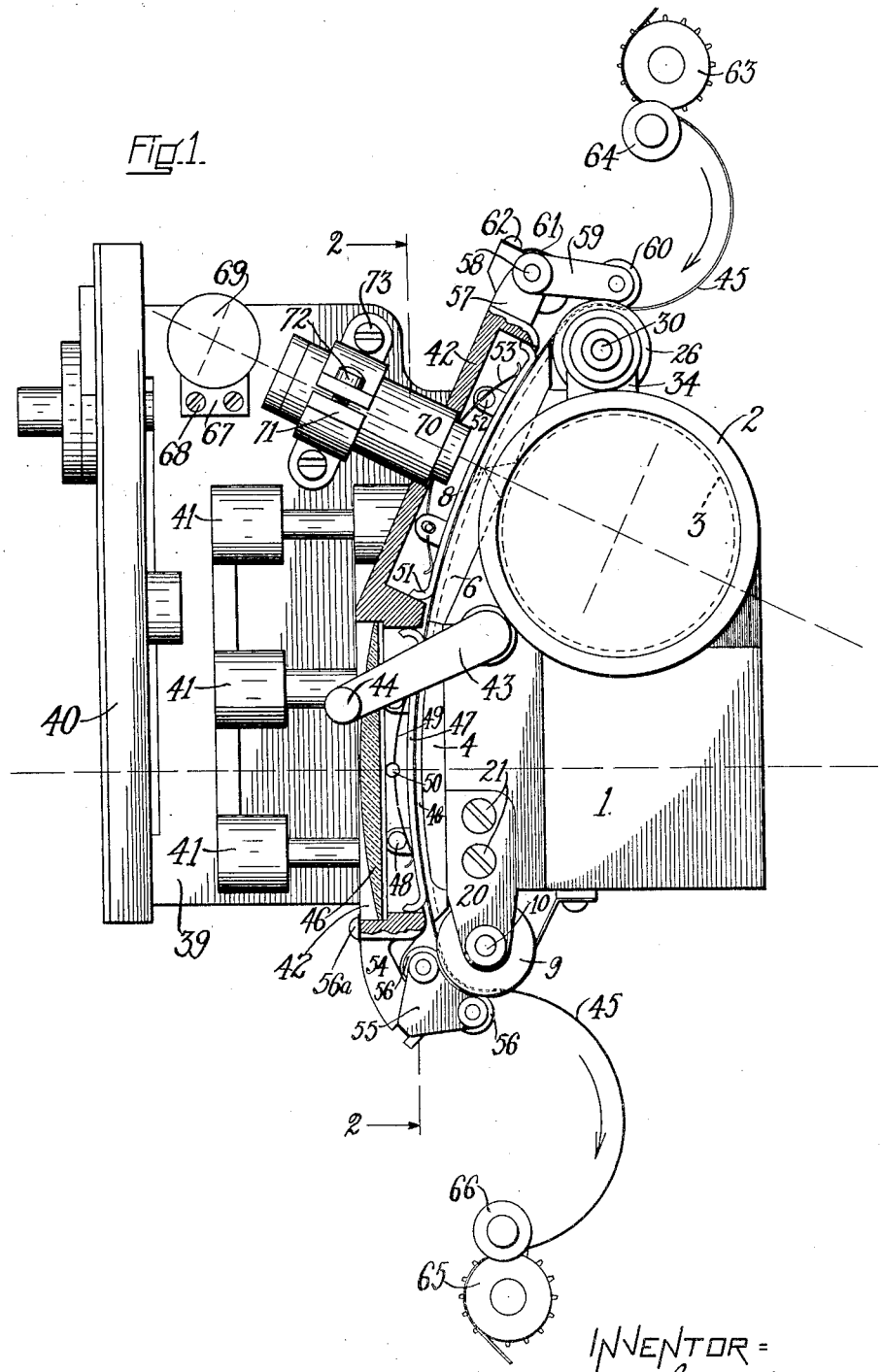

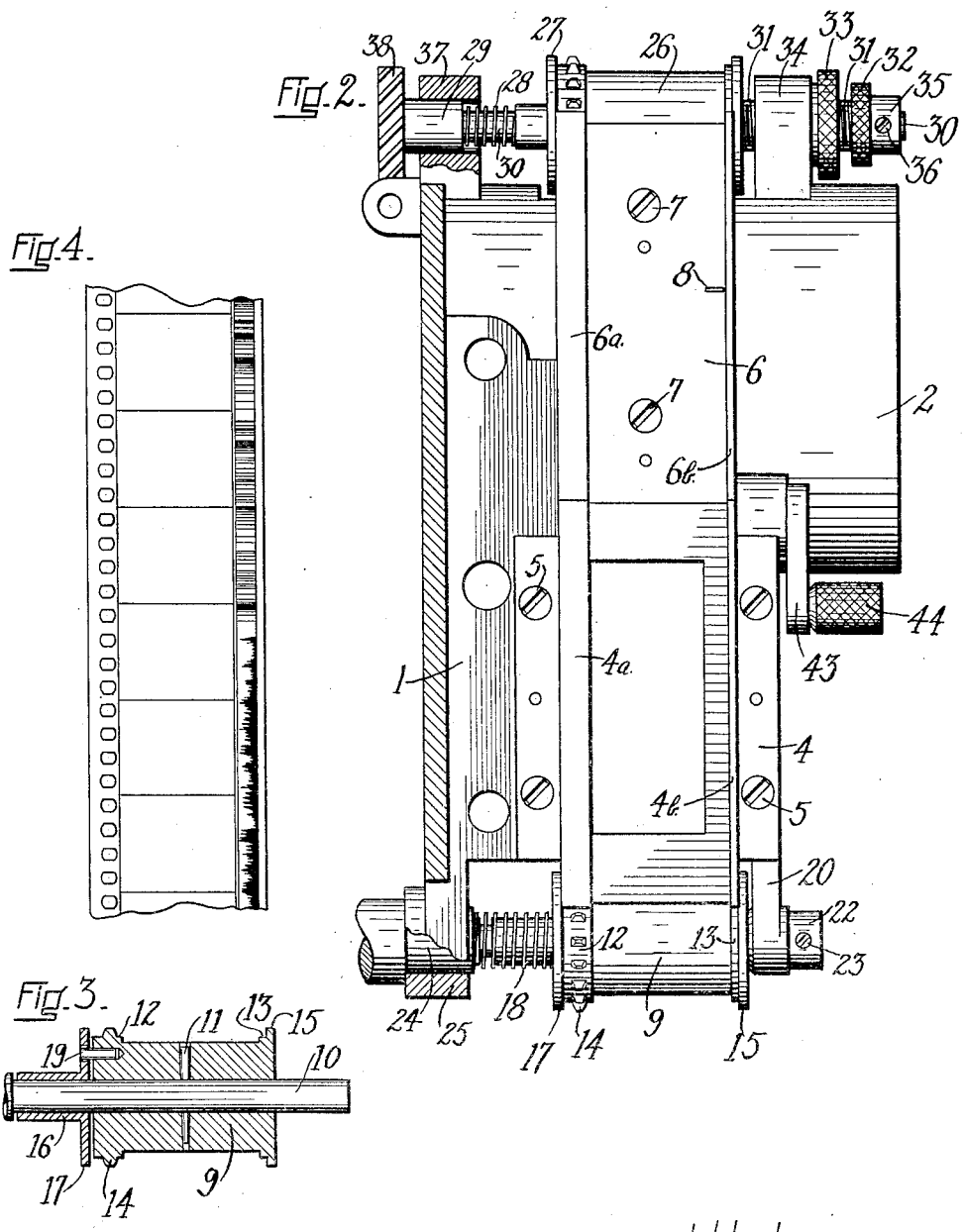

1,987,623

UNITED STATES PATENT OFFICE 1,987,623

MOTION PICTURE PROJECTING MACHINE FOR EXHIBITING IMPROVED SOUND-ON-FILM POSITIVE PRINTS

Arthur J. Holman, Brookline, Mass.

Application December 11, 1929, Serial No. 413,348

16 Claims. (Cl. 88—16.2)

My invention relates to an improved projecting machine with built-in sound reproducing equipment suitable for exhibiting my improved sound-on-film positive prints which are designed to accommodate the full picture area of the "silent" standard film frame, together with a sound track at least 50 percent wider than the present standard, on a 35 m.m. width film strip. It has been the special object of my invention to provide effective means for exhibiting positive prints whereon the "silent" standard picture area is retained and a broad sound track is made available by the elimination of the usual perforations along one edge of the film strip. A projector of the optical rectifying type described in my U. S. Patent No. 1,584,098 of May 11, 1926, accommodating a film strip moving continuously across the aperture, is exceptionally easy on the film strip as regards wear and damage to the perforations, and, when improved as hereinafter described and provided with a built-in sound reproducer, is well suited for exhibiting my improved sound-on-film positive prints. It has also been the object of my invention to build the sound reproducer into the aperture unit of my improved projector, thereby avoiding the necessity for extra sprockets, idler rollers, film gates etc., thus providing a sound equipped projector having the simplest film feeding mechanism and other advantages hereinafter described.

A further object of my invention has been to provide aperture plates, sprockets and idler rollers which are so formed as to provide proper supports and guides for the film strip as it passes through the projector without contacting with the film on either the celluloid or emulsion sides over the area of the sound track or over the picture area. In this manner I have sought to avoid all causes of scratches over the active film area and thus insure a prolonged useful life for the positive prints; a feature of great economic importance today when sound-on-film positive prints, especially those in natural color, are expensive and their present life is perhaps 50 to 75 passes through a projector.

My invention may be best understood by reference to the accompanying drawings in which Fig. 1 is a front view of my improved aperture unit with the gate shown in cross-section on the vertical plane through the optical axis of the projector, showing the upper and lower projector sprockets and the complete path of the film through the film feeding mechanism.

Fig. 2 is an enlarged cross-section on line 2—2 Fig. 1 with the gate removed to show the aperture plates and associated sprockets.

Fig. 3 is a cross-section through the axis of the aperture lower sprocket and the sliding pressure flange associated therewith.

Fig. 4 is a view of my improved sound-on-film positive print showing the elimination of perforations from one side and the addition of a wide sound track in association with the "silent" standard picture area on a 35 m.m. with film strip. On the upper part of the sound track is indicated the variable density system while below is shown the variable width system of sound record.

Referring now more specifically to the drawings, in which like reference numerals indicate like parts, 1 is an aperture frame provided with an integral cylindrical housing 2 (Fig. 1) within which is suitably supported a photo electric cell 3, the position of which is indicated by the broken line. Attached to the aperture frame 1 is the curved picture aperture plate 4 which is held in place by screws 5 (Fig. 2) and is provided with the usual raised track 4a on one side and a narrow raised track 4b on the other side. Directly above the picture aperture plate 4, and continuous therewith, is the curved sound aperture plate 6 which is attached to aperture frame 1 by screws 7 and is provided with a wide raised track 6a and a narrow raised track 6b which line up with the corresponding tracks on the picture aperture plate 4. A suitable aperture 8 is provided in the sound aperture plate 6 adjacent the narrow raised track 6b. The distance from the horizontal center line of the picture aperture plate 4, to the center line of the sound aperture 8, is determined by the diameter of the cylindrical housing 2, which encloses the photo-electric cell 3, and by the height of the vertically elongated aperture in the picture aperture plate 4. The spacing between center lines of picture and sound apertures, in the direction of film movement, is somewhat less than three inches.

A sprocket 9 (Fig. 3) secured to the shaft 10 by the taper pin 11 is provided with end portions 12 and 13 larger in diameter than the central portion, the end portion 12 being provided with the usual sprocket teeth 14 and the end portion 13 having adjacent thereto an integral flange 15. Slidably mounted on the shaft 10 is a sleeve 16 having integral flange 17 which, when pressed against the sprocket 9 by coil spring 18, (Fig. 2) has the same appearance as sprocket flange 15. A pin 19 press fitted into the sprocket 9 projects freely through a hole in the flange 17 and causes the flange to rotate with the sprocket.

The sprocket 9 is carried on the aperture frame 1 in a fixed lateral position below the picture aperture plate 4 in the following manner:—A bracket 20 attached to aperture frame 1 by screws 21 journals the shaft 10 carrying the sprocket 9 which contacts with a boss on bracket 20 and is kept in this position laterally by a collar 22 contacting with an opposite boss on bracket 20 and being secured to the shaft 10 by a set screw 23. An enlarged portion 24 of the shaft 10 is journaled in a lug 25 integral with aperture frame 1, the bore in lug 25 being aligned with the bore in the bracket 20. The sprocket 9 is driven from the projector mechanism and turns at a constant angular velocity thus imparting a constant linear velocity to the film strip which it actuates over the aperture plates.

A sprocket 26 exactly like sprocket 9 is provided with a laterally displaceable flanged sleeve 27 which is pressed toward the sprocket 26 by the coil spring 28 abutting against the enlarged portion 29 of the shaft 30. The flanged sleeve 27 is caused to rotate with the sprocket 26 in the manner already described in connection with sprocket 9. The sprocket 26 is carried on the aperture frame 1 at the top of the sound aperture plate 6 and is provided with lateral adjustment in the following manner:—A threaded bushing 31 provided with an integral knurled flange 32 and a knurled lock nut 33 is screwed into a lug 34 integral with and projecting upward from the cylindrical housing 2, and journals the shaft 30 on which is fast mounted the sprocket 26. The sprocket 26 is held in contact with the end of bushing 31 by a collar 35 which contacts with the other end of bushing 31, the collar 35 being held on shaft 30 by set screw 36. The enlarged portion 29 of the shaft 30 is journaled in a lug 37 integral with and projecting upward from the cylindrical housing 2, the bore in lug 37 being aligned with the tapped hole in lug 34. A helical gear 38, press fitted on that part of the enlarged portion 29 of the shaft 30 which projects beyond the lug 37, derives power from the sprocket 26 which is actuated by the film strip passing over the aperture plates, and operates a suitable fire shutter mechanism. The structure described permits precise lateral positioning of the integral flange on the sprocket 26 which must be accurately aligned with the corresponding flange 15 on sprocket 9 to insure correct positioning of the film strip over the aperture plates.

During the passage of the film strip across the aperture plates, the flanged sleeve 27, under the influence of coil spring 28, insures continuous contact of the edge of the film strip with the integral flange on the sprocket 26. Likewise the flange 17, under the influence of coil spring 18, insures continuous contact of the edge of the film strip with flange 15 on sprocket 9. Thus the sprockets 9 and 26, and their associated integral and sliding flanges provide a precise means for preventing side weaving of the film strip as it travels across the aperture plates. Any side weaving of the film strip at the sound and picture apertures would introduce serious disturbances to both sound and picture quality. Since applicants' present device is designed to operate with film having perforations along one edge only, it is necessary to provide positive means associated with the driving sprocket to assure proper and continuous alignment of the film strip.

Suitably attached to the frame 1 is a plate 39 which supports a fire shutter housing 40 and is provided with bosses 41 forming the rear supports for a suitable gate operating mechanism on which is carried the gate 42. The arm 43 provided with finger grip 44 is connected with the gate operating mechanism and depressing the finger grip 44 till the arm 43 becomes vertical will lock the gate 42 in the "open" position and permit placing the film strip 45 over the aperture plates.

Within the gate 42 and opposite the picture aperture plate 4 is mounted a suitable gate lens 46 the function of which is described in my U. S. Patent No. 1,617,596 of Feb. 15, 1927. Also mounted on the gate 42 opposite the picture aperture plate 4 and in alignment with the raised track 4a thereon is the tension shoe 47 which conforms in curvature to the track 4a. The tension shoe 47 has integral lugs formed thereon which are provided with elongated holes through which pass pins 48 which are press fitted into the gate 42. The heads of the pins 48 secure the tension shoe 47 to the gate and the elongated holes in the lugs allow the shoe to move backward and permit free passage of a film splice, the shoe being always maintained in contact with the film strip 45 under the influence of the leaf spring 49 which is held in position by the pin 50 press fitted into the gate 42. Within the upper part of the gate 42 directly above the tension shoe 47 and in alignment with the raised track 6a on the sound aperture plate 6 and conforming to the curvature thereof is tension shoe 51, which is similar to tension shoe 47 and is held in position by pins 52, being pressed into engagement with the film strip 45 by the leaf spring 53.

An integral bracket 54 projecting downward from the gate 42 supports a yoke 55 carrying idler rollers 56 which insure engagement of the sprocket 9 with the film strip 45, the yoke 55 being pressed toward the sprocket 9 under the influence of a suitable leaf spring secured to the gate 42 by the screw 56a. An integral bracket 57 projecting above the gate 42 has press fitted therein a pin 58 on which is hinged a yoke 59 carrying at its forward end an idler roller 60 which maintains engagement of the film strip 45 with the sprocket 26 under the influence of the leaf spring 61 attached to the bracket 57 by the screw 62.

The projector upper sprocket 63, similar to sprocket 9 and provided with idler roller 64 unwinds film from the reel in the upper magazine, draws the film through the magazine valve and feeds it to the upper loop maintained between sprocket 63 and sprocket 26. The lower projector sprocket 65, exactly like sprocket 63 and provided with idler roller 66 maintains the lower loop by preventing a too rapid winding up of the film by the take-up reel in the lower magazine. The projector upper sprocket 63, the aperture sprocket 9, and the lower projector sprocket 65 constitute the sum total of the sprockets required to actuate the film strip through my improved projector; the upper aperture sprocket 26 being part of the fire shutter operating mechanism and being actuated by the film strip.

A bracket 67 secured to the plate 39 by screws 68 supports the photo electric cell exciter lamp 69, light from which is concentrated on the aperture 8 in the sound aperture plate 6 by the optical system contained within the tube 70 which is clamped in the bracket 71 by screw 72, the bracket 71 being attached to plate 39 by screws 73.

In Fig. 4 I have shown the arrangement of picture area and sound track on my improved sound-on-film positive prints, the film strip being illustrated in the position it occupies on the aperture plate of the projector, in which position objects on the picture area are upside down, and the emulsion side of the film is up. The perforations shown in the left side of the print are standard in size, shape and position. The picture area represented is the standard for "silent" prints. A narrow strip along the right edge of the print equal in width to the end portion 13 (Fig. 3) on the sprocket 9 is reserved for contacting with the sprockets and the raised tracks 4b and 6b, the remaining space on the print with the exception of a narrow border adjacent the picture area being available for the sound track. The spacing, lengthwise of the film, between the action record and the sound record synchronous therewith, is exactly the same as the spacing between horizontal center lines of sound and picture apertures on the aperture unit, i. e., somewhat less than three inches. Further data on my improved sound-on-film positive prints is given in my co-pending patent application Serial No. 415,320 filed December 19, 1929.

It is to be noted that no wide raised track or tension shoes are provided on the aperture unit along that side of the film strip whereon the sound track appears, such parts not being essential to the proper movement of the film strip over the aperture plates as all tendencies to buckling and side weaving are overcome by the curvature of the raised tracks and by the rigid and the laterally displaceable pressure flanges associated with the aperture sprockets. The film strip, during its passage over the aperture plates, is steadied by the tension shoes 47 and 51 which exert a light pressure thereon, and is constrained to take the form of a portion of a cylindrical surface by the tracks 4a, 4b, 6a and 6b, thus becoming a structural shape which does not bow readily in other planes, thus effectively preventing buckling. The slight drag applied to the film strip by the fire shutter mechanism through the sprocket 26, which is film operated, also assists in holding the film strip in contact with the narrow raised tracks 4b and 6b. It is evident, therefore, that a relatively weak pull exerted on the film strip by the teeth of the aperture lower sprocket will overcome all resistance to film movement over the aperture plates, thus permitting the use of sprockets provided with teeth engaging perforations along one edge of the film strip only.

The possibility of damaging film perforations on the lower projector sprocket is avoided by the use of an improved take-up control such as is described in my U. S. Patent No. 1,721,734 of July 23, 1929, and, since very slight pull is required to be exerted upon the film strip by the projector upper sprocket, it is perfectly feasible to exhibit films having perforations along one edge only with my improved projector, the useful life of such films when so exhibited being at least several hundred passes through the projector. Since no part of the picture area or sound track area on the film strip comes in contact with sprockets, idler rollers, aperture plates, tension shoes or other parts of the projector, the screen image will remain clean and free from blemishes caused by dirt, oil and scratches on the film, and the reproduced sound will not be marred or modified in tone quality by similar blemishes over the area of the sound track. The useful life of my improved prints will be determined, therefore, by the number of exhibitions required of a given subject rather than by the rate of deterioration of the prints from use.

The operation of my improved projector does not differ from the operation of the machine described in my said projector patent in any respect as regards picture presentation since the sound reproducing equipment is added without complicating the film feeding mechanism. As no novelty is described and claimed with respect to the sound pick-up system as such, a description of its operation does not properly come within the scope of this application.

The chief advantages of my improved projector are; the sound reproducing system is built into the aperture unit thus eliminating much additional and costly apparatus through which the film strip must ordinarily be threaded and fed, all of which involves more wear and damage to the film thereby shortening its life; the built-in reproducer, together with my improved sound-on-film positive prints, permits the use of the old full size film frame in connection with an extra wide sound track on 35 mm. film, the standard "silent" film frame allowing the usual magnification ratio and therefore giving the customary "silent" screen image quality, the extra wide sound track producing greatly improved quality and range of tone and being less sensitive to scratches and other imperfections; the addition of the sound reproducer does not complicate the projector nor does it materially increase its size and cost, on the other hand, the capacity for reproducing improved tone quality together with the well recognized superior quality of screen image and the exceptionally long film life, makes my improved projector the most desirable and therefore the logical choice for quality presentations. Other obvious advantages are; unit construction, representing simplicity in mechanism, ease and economy in operation and maintenance, and undivided responsibility in manufacture; close coupling of sound and picture apertures, representing complete elimination of accurate loop setting to synchronize sound with action, and a more nearly synchronous loss of sound and action when damaged parts are removed from prints; simplicity of threading and elimination of excessive friction and pull on the film relieving all anxiety on the part of the projectionist thus making for superior presentations; and, since the projector is adapted to take any standard width film, sound-on-disc and silent prints may be run without changing aperture plate and objective lens.

In as much as any apparatus capable of exhibiting pictures is, by obvious means, adaptable to taking pictures, it is apparent that my improved aperture unit may be used in modified form in a camera. Since the film feeds over the photographing aperture at a uniform linear velocity, the camera mechanism may be made exceptionally quiet, thus adding materially to its usefulness in sound studios. Moreover, the sound record may be photographed directly on the picture negative in proper spaced relation to permit direct reproduction of sound-on-film positive prints in a single printing operation, thus securing the best possible photographic quality in the simplest way. The simultaneous recording of sound and action in a single instrument, which may be readily accomplished with my device, eliminates entirely the complex synchronizing apparatus required when sound and action are recorded in separate machines. Because of these and other advantages of my improved aperture unit and sound film, which will be obvious to those skilled in the art, it is to be understood that my claims, when applicable, are to be interpreted as applying to a camera as well as to a projector. The claims referring to sprockets and aperture plates are intended to apply on all film feeding devices including printing machines, measuring devices etc.

Having thus fully described my invention, what I claim is:

1. In a combined sound and picture aperture unit of the character specified, a picture aperture plate having a wide raised curved track adjacent one edge and a narrow raised curved track adjacent the opposite edge, and containing an elongated aperture extending to the inner edge of said wide raised curved track and being symmetrically positioned with respect to the outer edges of said tracks, the non-symmetrical arrangement of said tracks being required to avoid contact, over the photographic areas, with a film strip containing a single row of perforations.

2. In a combined sound and picture aperture unit of the character specified, a sound aperture plate having a wide raised curved track adjacent one edge and a narrow raised curved track adjacent the opposite edge, and containing a sound aperture adjacent said narrow track, the width of said narrow track plus the length of said sound aperture being less than the width of said wide track, said tracks being adapted and arranged to contact with a specially perforated film strip over its non-photographic areas.

3. In a combined sound and picture aperture unit of the character specified, the combination of a picture aperture plate having a wide raised curved track adjacent one edge and a narrow raised curved track adjacent the opposite edge, said curved tracks being adapted and arranged to contact with a specially perforated film strip over its non-photographic areas, and a sound aperture plate, said sound aperture plate having raised curved tracks corresponding to and continuous with said raised curved tracks on said picture aperture plate, and containing a sound aperture adjacent the narrow raised track.

4. In a sound aperture unit of the character specified, the combination of a sound aperture plate having a wide raised curved track adjacent one edge and a narrow raised curved track adjacent the opposite edge, and containing a sound aperture adjacent said narrow track, a power driven constant speed feed sprocket mounted on said aperture unit, said sprocket being provided with pads corresponding to and in alignment with said tracks on said sound aperture plate, the wide pad on said sprocket being provided with teeth adapted and arranged to enter perforations along one edge of a film strip, and resilient and rigid means associated with said sprocket and adapted and arranged to maintain continuously the exact lateral positioning of said film strip on said sprocket.

5. In a complete sound-on-film film feeding mechanism of the character specified, the combination of an upper loop feed sprocket, an aperture unit including continuous sound and picture aperture plates each provided with corresponding wide and narrow raised curved tracks, and a second feed sprocket, a lower loop maintaining sprocket, teeth on each of said sprockets adapted to engage in perforations along that edge of a film strip which contacts with said wide raised curved tracks, idler rollers associated with said sprockets and adapted to retain said film strip in engagement therewith, said sprockets and said idler rollers being adapted and arranged to contact with said film strip only over non-photographic areas, and means for actuating said sprockets non-intermittently.

6. In an aperture unit of the character specified, the combination of an aperture frame, a curved picture aperture plate, a curved sound aperture plate, an optical sound pick-up means, a gate operating mechanism, a gate carried on said gate operating mechanism, yielding means mounted within said gate for retaining a film strip passing through said aperture unit in contact with said curved aperture plates, and means for actuating said film strip over said aperture plates.

7. In an aperture unit of the character specified, the combination of an aperture frame, a curved picture aperture plate, a curved sound aperture plate, an optical sound pick-up means, a gate operating mechanism, a gate carried on said gate operating mechanism, curved tension shoes movably mounted within said gate, springs adapted to press said tension shoes into contact with a film strip passing over said aperture plates in a manner whereby said film strip may conform to the curvature of said plates, and means for actuating said film strip over said aperture plates.

8. In an aperture unit of the character specified, the combination of an aperture frame, a curved picture aperture plate, a curved sound aperture plate, an optical sound pick-up means, a gate operating mechanism, curved tension shoes movably mounted within said gate, springs adapted to press said tension shoes into contact with a film strip passing over said aperture plates in a manner whereby said film strip may conform to the curvature of said plates, and means for actuating said film strip over said aperture plates, said means comprising a power driven feed sprocket mounted on said aperture frame and provided with a single row of teeth adapted and arranged to engage in perforations along one edge of said film strip, and idler rollers adapted to retain said film strip in engagement with said sprocket.

9. In an aperture unit of the character specified, the combination of an aperture frame, a curved picture aperture plate, a curved sound aperture plate continuous with said picture aperture plate, an optical sound pick-up means, a film feed sprocket mounted on said aperture frame below said picture aperture plate, a laterally adjustable fire shutter mechanism operating sprocket mounted above said sound aperture plate, a gate operating mechanism, a gate carried on said gate operating mechanism, and means on said gate adapted and arranged to constrain a film strip passing through said aperture unit to conform to the curvature of said aperture plates, to follow a fixed path thereover, and to remain engaged with said sprockets.

10. In a combined action and sound-on-film recording or exhibiting machine, an aperture unit including a curved picture aperture plate, a curved sound aperture plate continuous with said picture aperture plate, an optical sound recording or pick-up means, means for retaining a film strip in contact with said plates, means for maintaining continuous alignment of said film strip with said aperture plates, and a film feeding means for actuating said film strip across both aperture plates, said film feeding means comprising a power driven constant speed sprocket mounted on said aperture unit, and means for retaining said film strip in engagement with said sprocket.

11. In a combined action and sound-on-film recording or exhibiting machine, an aperture unit including a curved picture aperture plate, a curved sound aperture plate continuous with said picture aperture plate, an optical sound recording or pick-up means, means for retaining a film strip in contact with said plates, means for maintaining continuous alignment of said film strip with said aperture plates, and a film feeding means for actuating said film strip across both aperture plates, said film feeding means comprising a power driven constant speed sprocket mounted on said aperture unit and provided with teeth adapted to engage in perforations along one edge of said film strip, and idler rollers for retaining said film strip in engagement with said sprocket.

12. In a moving picture device for recording action and sound on a film strip having a row of perforations adjacent one edge, an aperture unit including curved aperture plates, said aperture plates being provided with wide raised tracks adapted to contact with said film strip adjacent the perforations therein and narrow raised tracks adapted to contact along the opposite edge thereof, a picture aperture in one of said plates adapted to expose the central zone of said film strip and a sound recording aperture in the other of said plates spaced less than three inches from the center of said picture aperture and arranged to expose a sound track on said film strip between said central zone and said narrow raised track, means for retaining said film strip in contact with said aperture plates, and means for actuating said film strip across said apertures.

13. In a moving picture device for exhibiting a sound-on-film print having a row of perforations adjacent one edge and a sound track adjacent the other, an aperture unit including an aperture plate, said aperture plate being provided with a wide raised track, a narrow raised track and a picture aperture positioned centrally with respect to the outer edges of said tracks, such positioning of said picture aperture making said device suitable for exhibiting "silent" prints and other prints having centralized picture area, without change of aperture plates or objectives.

14. In a film feeding mechanism adapted and arranged to function with a film strip having perforations along one edge only, an aperture unit including a curved aperture plate having one wide and one narrow raised track, adjustable means positioned above said aperture plate and adapted and arranged to provide positive and exact lateral positioning of one edge of a film strip passing across said aperture plate, a feed sprocket positioned below said aperture plate, pads on said sprocket corresponding to and in alignment with said raised tracks, an integral flange on said feed sprocket adapted and arranged to form a positive guide for that edge of said film strip which is exactly positioned by said adjustable means located above said aperture plate, and a spring actuated sliding flange associated with said feed sprocket and adapted and arranged to maintain continuous contact of said film strip with said integral flange on said feed sprocket thereby preventing side weaving of said film strip as it moves across said aperture plate.

15. In a moving picture device for exhibiting a sound-on-film print having a row of perforations adjacent one edge and a sound track adjacent the other, a complete film feeding means comprising a curved picture aperture plate, a curved sound aperture plate continuous therewith, wide raised tracks on said plates adapted to contact with said print adjacent the perforations therein and narrow raised tracks adapted to contact along the opposite edge of said print adjacent the sound track thereon, the spacing between centers of picture and sound apertures in said plates being less than three inches, an upper feed sprocket, an aperture feed sprocket, a lower loop maintaining sprocket, and means associated with said aperture plates and said sprockets adapted and arranged to retain said print in alignment and in engagement therewith.

16. In a mechanism for feeding a film strip having a row of perforations adjacent one edge and a sound track adjacent the other, a curved picture aperture plate and a curved sound aperture plate continuous therewith, wide raised tracks on said plates adapted to contact with said film strip adjacent the perforations therein and narrow raised tracks adapted to contact along the opposite edge of said film strip adjacent the sound track thereon, and means for constraining said film strip passing across said plates to conform to the curvature thereof, said curvature being continuous and uniform throughout the entire length of both aperture plates.

ARTHUR J. HOLMAN.